US006421709B1

(12) United States Patent
McCormick et al.

(10) Patent No.: US 6,421,709 B1
(45) Date of Patent: Jul. 16, 2002

(54) E-MAIL FILTER AND METHOD THEREOF

(75) Inventors: William B. McCormick; David Kopans; George Stojanoff, all of Charlottesville, VA (US)

(73) Assignee: Accepted Marketing, Inc., New York, NY (US)

( * ) Notice: Subject to any disclaimer, the term of this patent is extended or adjusted under 35 U.S.C. 154(b) by 0 days.

(21) Appl. No.: 09/348,460

(22) Filed: Jul. 7, 1999

Related U.S. Application Data

(63) Continuation-in-part of application No. 08/995,860, filed on Dec. 22, 1997, now Pat. No. 6,023,723.
(60) Provisional application No. 60/091,935, filed on Jul. 7, 1998.

(51) Int. Cl.[7] .............................................. G06F 15/16
(52) U.S. Cl. ...................................... 709/206; 709/207
(58) Field of Search .................................. 709/206, 207

(56) References Cited

U.S. PATENT DOCUMENTS

| | | | |
|---|---|---|---|
| 5,999,967 A | * 12/1999 | Sundsted | 709/206 |
| 6,052,709 A | * 4/2000 | Paul | 709/202 |
| 6,072,942 A | * 6/2000 | Stockwell et al. | 709/206 |
| 6,161,130 A | * 12/2000 | Horvitz et al. | 709/206 |
| 6,249,805 B1 | * 6/2001 | Fleming, III | 709/206 |

* cited by examiner

*Primary Examiner*—Saleh Najjar
(74) *Attorney, Agent, or Firm*—Hoffman, Wasson & Gitler PC

(57) ABSTRACT

A system and method of filtering junk e-mails. A user is provided with or compiles a list of e-mail addresses or character strings which a user would not wish to receive to produce a first filter. A second filter is provided including names and character strings which the user wishes to receive. Any e-mail addresses or strings contained in the first filter will be automatically eliminated from the user's system. Any e-mail addresses or strings contained in the second filter would be automatically sent to the user's "in box". Any e-mail not provided in either of the filtered lists will be sent to a "waiting room" for user review. This user review results in the user rejecting any e-mail, the addresses as well as specific character strings included in this e-mail would be transmitted to a central location to be included in a master list. This master list is periodically sent to each of the users allowing the first filter to be updated. A collaborative filter is used employing message base filtering that is not effected by e-mail header forgery and utilizes the networked intelligence of end users to maintain a highly inaccurate and comprehensive filter. The collaborative filter would then use the real-time input from the end users to keep the users involved in the filtering process.

2 Claims, 11 Drawing Sheets

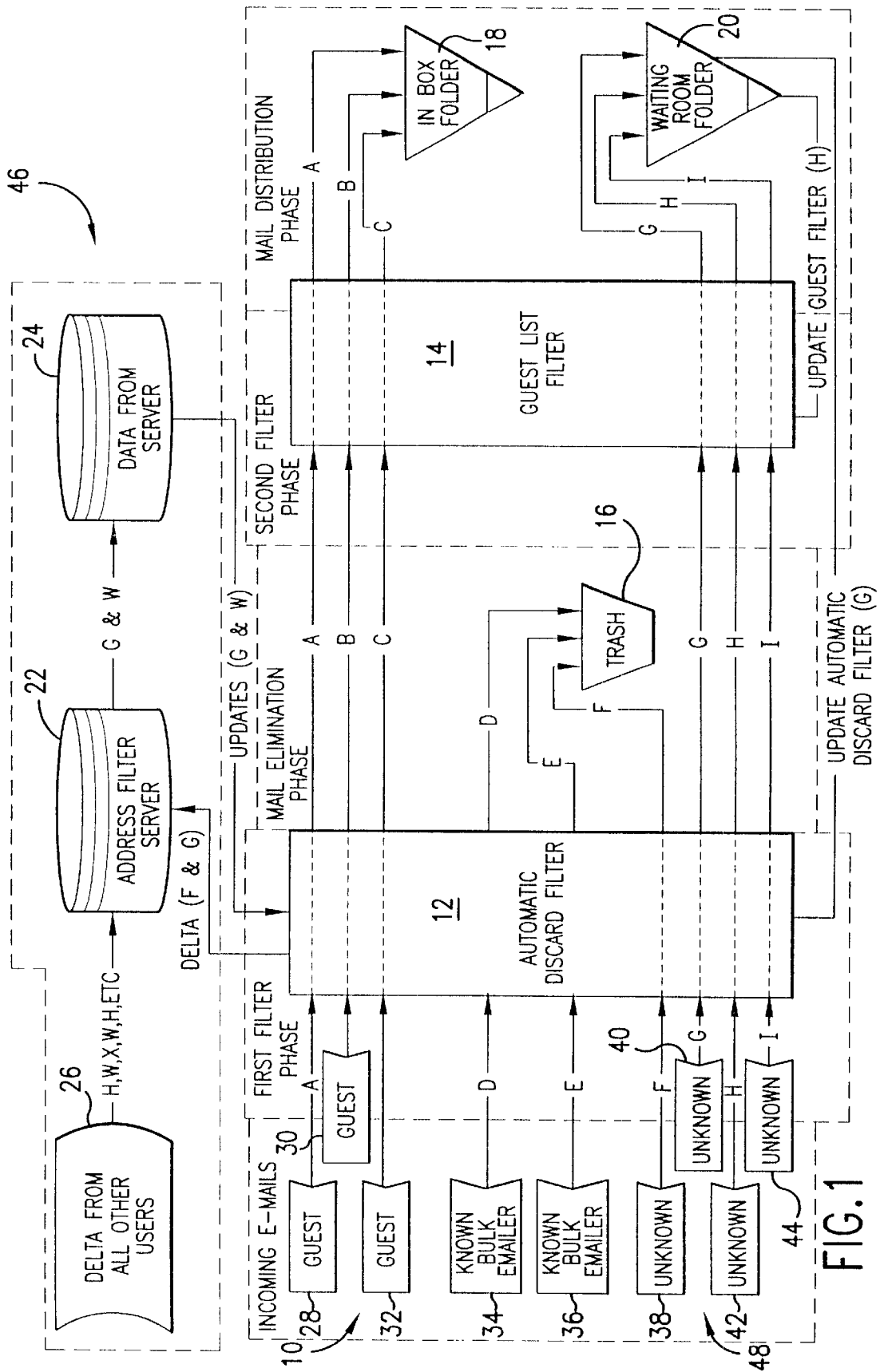

50

NO ADMITTANCE LIST

52 sWallace@cyberprom.com
free money
news@sexygirls.com

[UPDATE]

GUEST LIST

54 bill@zerojunkmail.com
andria@zerojunkmail.com
scotT@aol.com

WAITING ROOM — 20 ZJM Two Way E-Filter

| SPA | Label | Who | Date | K | V | Subject |
|---|---|---|---|---|---|---|
| F | | mbolten@poj | 1:30AM | 4 | | Hair Cut Q |
| | | newton@appl | 1:35AM | 8 | | Air Spee R |
| | | ruby@yeahri | 2:11AM | 9 | | Me,Mys |
| | | spam@spam | 3:34AM | 2 | | Buy or v F |
| | | MakeMoney | 4:05AM | 8 | | 300% R |
| | | InstantCashN | 5:12AM | 6 | | No Cred |
| | | mccann@slo | 6:31AM | 8 | | Bon Jov |

[Empty] 56    [Add to No Admittance] 58

IN BOX — 18 ZJM Two Way E-Filter

| SPA | Label | Who | Date | K | V | Subject |
|---|---|---|---|---|---|---|
| Q | | ozzy@metal. | 6:22PM | 8 | | Tuxedo Ne |
| R | | albertE@prir | 6:41PM | 7 | | Comb? |
| F | | andria@zero | 8:12PM | 2 | | Re: Carpen |
| | | bill@zerojun | 9:01PM | 4 | | Football T |
| | | frank@zeroji | 9:21PM | 2 | | Who Am I |

[Add to Guest List] 60

Address Name  news@sexygirls.com

Present Count  0000000159

Historic Count  0000017991

Last Submission  97 10 27 08 48 12
                 Yr Mth Day Hr Min Sec

Notes  Letter sent requesting removal 9/15/97

○ Permanently Active Address
○ Permanently Inactive Address

Source  CyberPromotions

Save | Delete

Search Results
sex@moresex.com    8:48 AM  10:27:97  1208
MoreCash@funco.net  9:20 AM  10:27:97  103
news@sexygirls.com  8:48 AM  10:27:97  17991

New Search

● Address Database
   F:\address\address.dbase
○ Member Database
   C:\member\member3.acl Current Filter  F:\billsdirectory\billsworld\ZJM.Fil ● Auto Update every  00  06  30  00
                     Day Hr Min Sec
● Auto Save every    02  00  00  00
                     Day Hr Min Sec Save As  C:\BackUp\ZJM2.Fil Days Limit  030   Minimum Number  010

Update Filter

Save Filter 64, 66, 68, 70, 72, 74, 76, 78

E-MAIL FILTER AND METHOD THEREOF

CORRESPONDING APPLICATIONS

This application is a continuation-in-part application of Ser. No. 08/995,860, filed Dec. 22, 1997, now U.S. Pat. No. 6,023,723, and claims the benefit of provisional application No. 60/091,935 filed Jul. 7, 1998.

FIELD OF THE INVENTION

The present invention relates to an electronic or e-mail filter system as well as a method of filtering unwanted e-mail messages.

BACKGROUND OF THE INVENTION

No cogent argument can legitimately be made refuting the fact that technology while generally benefitting mankind, does have its occasional deficiencies. This is certainly true with respect to the communications industry. Unfortunately, each technology advancement relating to the ease and facility of providing communications between various individuals or companies have created minor headaches or problems. Although used So sporadically since the early 1920's the utilization of the airplane in the mail industry since the end of World War II allowed individuals and communities on both the east and west coast to be linked with one another. Mail sent from New York to Los Angeles would be received within two or three days from the date that the communication was originally posted. Although the use of airmail had a salutatory affect upon the communication between individuals and other entities, various companies seized upon this relatively inexpensive means of communication to inundate the public with a large number of junk mail solicitations. Unfortunately, to the chagrin of many of these junk mail operators, the public could generally determine which mail was important and which was not, based upon a number of factors such as the type of envelopes which were utilized, the return address of the sender as well as the manner in which the sendee was addressed. Therefore, many of these solicitations were never opened and were merely discarded.

The deregulation of the telecommunications industry as well as the increased usage of "800" type numbers has resulted in an increased number of unwanted telephone solicitations. While tending to be an annoyance, once the called party determines that they are not interested in any solicitations or the type of solicitations offered by the caller, the called party can merely hang up his or her receiver.

Increased use of facsimile machines in both the work environment as well as personal facsimile machines at home created another avenue for unwanted solicitations. Since technology allowed a single letter of solicitation to be transmitted to a large number of facsimile machines with ease, it is easy to see that facsimile machine solicitations became an annoying problem, particularly when the individuals machine was receiving a large number of correspondences utilizing the receivers own paper. Furthermore, these solicitations were tying up the users telephone line so that important messages were delayed or never received. Due to an outcry by the public, legislation was passed to forbid these types of unsolicited communications directed to facsimile machines.

The explosion in the personal computer "PC" industry has provided solicitors with yet another manner of sending unsolicited messages. More and more businesses as well as individual users are connected to one another over the Internet and Intranet 11. Similar to the situation with respect to facsimile machines, a solicitor can compose a message and send it on the Internet and Intranet 11 to a relatively large number of personal computers. Although these e-mail messages are not necessarily reproduced on paper in the manner that the facsimile messages were previously received, the receipt of these messages would prevent other legitimate messages from being received in a timely manner. Therefore, it is clear that a system and method of filtering unwanted e-mail messages must be developed to shield the PC user from the annoyance of unsolicited junk e-mail.

U.S. Pat. No. 5,619,648 issued to Canale et al is directed to a technique for reducing the amount of junk e-mail received by a user in an e-mail system. As illustrated with respect to FIG. 1 of the Canale et al patent, a user 105 who wishes to reduce the amount of junk e-mail which is received, would be provided with a mail filter 109. A mail item 119 in the system would include a standard e-mail message as well as a recipient specifier 121 which uses non-address information to further describe the recipients who would receive the e-mail as well as a referral list 127 which is a list of potential recipients who pass the e-mail on and of recipients to whom the e-mail was provided. The recipients specifier 129 also includes a recipient description 125. If the recipient description specifies a recipient which is of the same kind as that specified by the user model 113, the mail filter 109 adds the mail item 119 to filtered mail 115. The mail filter 109 can utilize the information in the referral list 127 to indicate a chain of referrals which resulted in the message being directed to the user 105. While this system can be utilized to reduce a users junk e-mail, it does not necessarily include a filter technique in which mail sent by a sender included in an approved guest list filter would be designated as such when received by the user. Additionally, this system is not utilized in a manner allowing an updated master list of junk e-mail addresses or senders to be developed and transmitted to other users in the system.

U.S. Pat. No. 5,093,918 issued to Heyen et al; U.S. Pat. No. 5,283,856 issued to Gross et al; U.S. Pat. No. 5,377,354 issued to Scannell et al; U.S. Pat. No. 5,632,011 issued to Landfield et al and U.S. Pat. No. 5,634,005 issued to Matsuo are all directed to various systems for sorting and managing electronic mail or similar messages. However, similar to the Canale et al patent, these patents do not describe a method or system in which electronic e-mail can be effectively filtered by the user as well as compiling an updatable master list of unwanted e-mail transmitters which is then transmitted to the end user for filter purposes.

SUMMARY OF THE INVENTION

The present invention overcomes the problems of the prior art by utilizing a method and system for filtering unwanted junk e-mail sent to the user's computer. The user would include various addresses or other defining characteristics in a "No Admittance List" as well as a plurality of addresses in a "Guest List". An incoming e-mail whose addresses are included in the "No Admittance List" would be immediately discarded. Any address in the "Guest List" would be immediately forwarded to an "In Box". Any address not included in either the "No Admittance List" or the "Guest List" would be forwarded to a "Waiting Room". The user would periodically review the e-mail included in the "Waiting Room". Based upon this review, the user would either discard the e-mail to a "Trash Bin" or would send the e-mail to the "In Box". The addresses of e-mails which were discarded after the users review could be automatically added to the "No Admittance List". Additionally, the address of any e-mail added to the "In Box" after the user's review could also be automatically added to the "Guest List". Addresses of e-mail which are discarded would be periodically sent to a filter server thereby adding the addresses to a master list. This master list is then periodically transmitted to all of the users in the system through a download server.

The following glossary of terms define various comments described in this application.

A Mail Server is any service that handles the Simple Mail Transfer Protocol (SMTP). Mail Servers are also known as Message Transport Systems (MTS). Examples of Mail Servers are Sendmail, Microsoft's Exchange, etc.

Mail Storage refers to any type of system for storing electronic mail (usually stored per user in mailboxes). Mail Storage can consist of file storage, a database, etc.

A Mail Drop Service is any service that allows users to directly retrieve messages from their mailboxes. Users' e-mail clients usually directly interact with a Mail Drop Service via some protocol. Examples of protocols used by Mail Drop Services are the Post Office Protocol (POP) and the Internet Message Access Protocol (IMAP).

A Mail Reader is any application that can send and retrieve e-mail via a Mail Drop Service. Mail Readers are also known as User Agents (UA). Examples of Mail Readers are Qualcomm's Eudora, Microsoft Outlook, Netscape Communicator, Elm, Mh, etc.

Spam is any unwanted e-mail, also known as unsolicited commercial e-mail (UCE) or junk e-mail.

BRIEF DESCRIPTION OF THE DRAWINGS

These and other attributes of the present invention will become more apparent in light of the following detailed description of an illustrative embodiment thereof, as illustrated in the accompanied drawings of which:

FIG. 1 is a process flow chart and block diagram illustrating the present invention;

FIG. 2 is a typical example of a graphic user interface according to the present invention;

FIG. 4 is a typical control screen illustrating a new search on a member database;

FIG. 5 is a control screen illustrating the search results of a member database;

FIG. 6 is a control screen illustrating a new search on an address database;

FIG. 7 is a control screen illustrating the search results of an address database;

DESCRIPTION OF THE PREFERRED EMBODIMENTS

Figure 3:
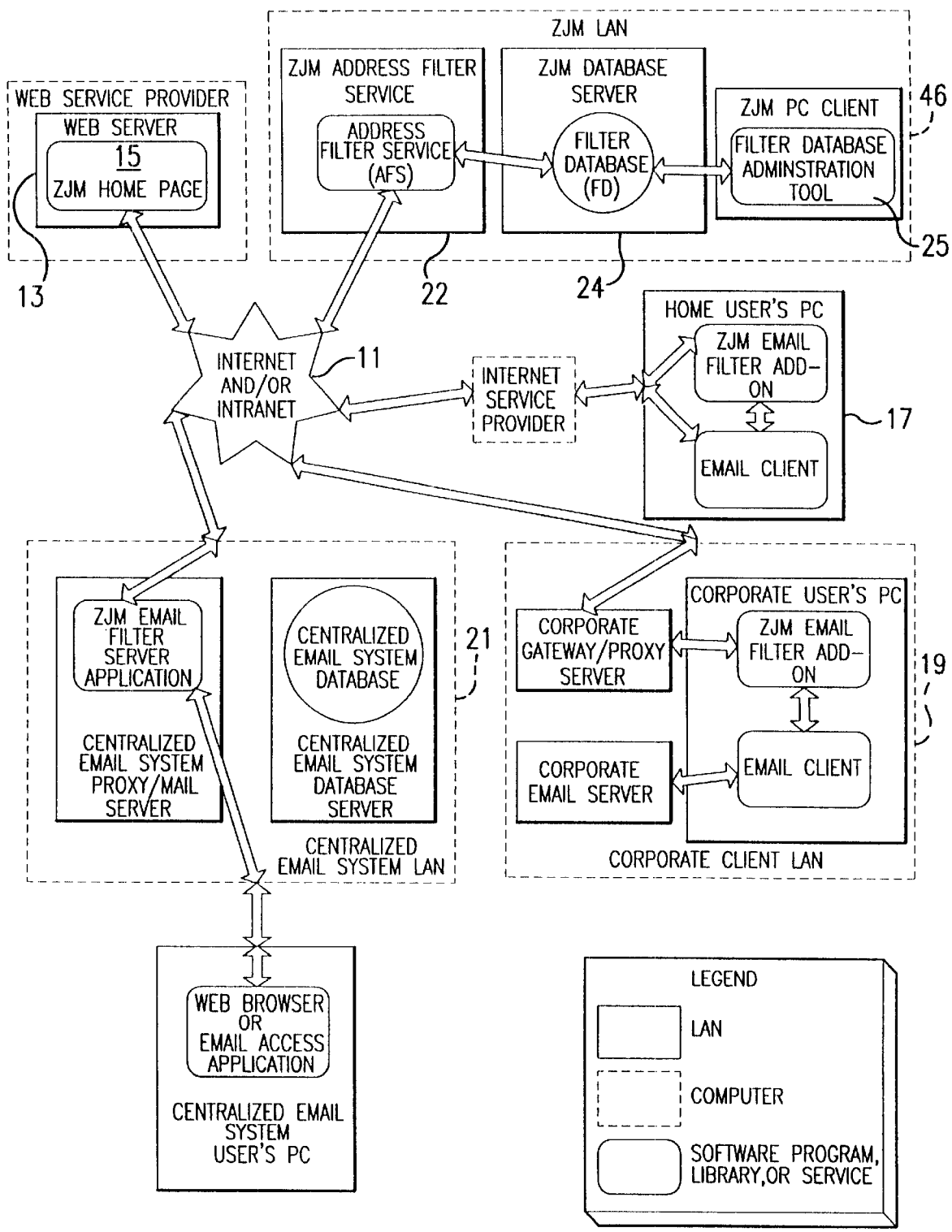
FIG. 3 is a block diagram showing various components of the present invention.

Turning to FIG. 1, the entire system of the present invention 10 broadly includes a section 48 associated with a user's personal computer and a section 46 provided at a location remote from the personal computer and connected therewith by a standard wired or wireless telecommunications link or any other communications methodology. Each of the users who are part of the system according to the present invention, would be provided with appropriate software allowing each of the users to prepare individualized dual filters to automatically prevent certain unwarranted e-mail from being received as well as to automatically receive desired e-mail. The software can be installed directly by the user or would be resident within popular mail programs, and once installed be transparent to the user. One of these filters is automatically updated by other users in the system when known unwanted e-mail addresses are determined. This software would also allow the individual to use a customized graphic user interface to assemble the filters. A typical graphic user interface will be discussed in more detail hereinafter. However, it is noted that the exact nature of the graphic user interface can vary depending upon its application and implementation.

The software would allow the individual user to construct an automatic discard filter 12. The automatic discard filter is a collective term consisting of a user modified discard filter, a user personal address filter as well as a user personal string filter. During operation of the system, the automatic discard filter 12 would include a current filter list comprising a list of active e-mail addresses against which incoming e-mails are compared. This current filter list is retained in a memory section of the users computer. Any comparison between any incoming e-mail and the current filter list could be accomplished within the user's computer system. The current filter list is maintained at the remote central location 46 as well as being periodically updated in each of the users PC systems 48. The remote location 46 would include a delta filter server 22 and download server 24 for a particular user as well as delta server filter 26 from all other users. The current filter list can be modified by the user to personally remove any addresses therefrom through various deletion techniques, thereby providing the user with a user modified discard filter. The user personal address filter would include additional addresses the user has added to the current filter list as well as any character strings that the user has added via a text entry containing an "@". For the purpose of the present invention, a text entry is a character string entered into the system by keyboard typing. Typing is initiated by double clicking or highlighting and typing, thereby clearing an old string and creating a new string. When the mouse is clicked on some other location or "enter" is hit, the string will be entered into the appropriate memory structure for the new field.

The user personal string filter is defined as any character string that the user had added to the automatic discard filter to create a "No Admittance List" via text entry that does not contain the "@". The term "No Admittance List" would be a list of terms and addresses included to create the automatic discard filter. The "No Admittance List" 52 is included in the graphic user interface 50 illustrated in FIG. 2.

The Guest List Filter 14 includes addresses the user has personally added to the system, for example by dragging an e-mail to the "Guest List" 54 shown in the graphic user interface of FIG. 2, or by any other means. The Guest List Filter 14 also includes any character strings the user has added via a text entry containing an "@".

Any e-mail received by the user is checked against the automatic discard filter 12 to determine whether any character string on the "No Admittance List" 52 will bar entry of any e-mail with matching text in its address, subject line or message body. If this occurs, that e-mail will be eliminated from the users system as indicated by the Trash Bin 16.

Conversely, any address contained in the Guest List which matches an address of an incoming e-mail would be automatically forwarded to the In Box folder 18 for review by the user. Similar to the situation with respect to the No Admittance List 52, a text string entered in the Guest List 54 would forward all messages containing that character string to the "In Box" folder 18. This feature would allow users to receive on-demand direct marketing information from parties, promoting products for which the user has expressed interest based upon the text string entered in the Guest List 54.

Incoming e-mail which is not filtered by the automatic discard filter 12 based upon the No Admittance List 52 or is included in the guest list filter 14 as embodied in the Guest List 54 would be automatically sent to a Waiting Room folder 20 to be individually reviewed by the user.

Unknown e-mail stopped by the automatic discard filter 12 based upon the inclusion of an unwarranted character string or based upon a personal review by the user would be used to both automatically update the addresses included in the automatic discard filter as well as to alert other users in the system of the existence of objectionable e-mail addresses. These new addresses are periodically and automatically transmitted to a address filter server 22 provided at the remote central location 46. Based upon numerical and temporal factors as described hereinafter, these addresses are included on the current filter list associated with the address filter server 22 stored in a filter database associated with a database server 24 in communication with the address server 22.

Periodically, the database server 24 in communication with the address filter server 22 would download updated filter addresses to the various users in the system by constructing an address packet consisting of every address on the current filter list since the date and time of each of the users last update. The address packet is a data structure consisting of N strings of e-mail addresses and a variable containing the time of construction of the packet. The packet is compressed for downloading and uploading multiple e-mail addresses. Based upon the particular implementation of the software of the present invention, the updated version of the current filter list is substituted for the No Admittance List currently provided in the users system. Alternatively, since the No Admittance List might include addresses and character strings personally added by the user but not included in the current filter list, the updated filter list would be compared with the automatic discard filter and any additional entries not included in the automatic discard filter would be added thereto.

FIG. 2 illustrates the In Box folder 18 and the Waiting Room 20 in more detail as well as giving examples of the type of messages included therein. The list of names included ES6 on the automatic discard filter 12 are provided in the No Admittance List 20. Any incoming e-mail whose new address matches one of the addresses on this list is immediately discarded to Trash 16. Addresses may be added to this list via an update button 61, the Add to No Admittance button 58, text entry, or by dragging a selected e-mail to this window with the mouse. The update button 62 automatically downloads the latest automatic discard filter from the download server 24. The updated filter list is displayed in the No Admittance Window. Simultaneously, user added e-mail addresses are sent to the Delta Filter Server 22 for consideration in future updates to the users in the system.

The Waiting Room folder 20 includes only those e-mails that have successfully passed through both the automatic discard filter but are not included on the Guest List filter 54. Additionally, any e-mail from any folder may be selected and dragged into the Waiting Room 20 by the user using his or her mouse. The Waiting Room display as shown in FIG. 2 would include e-mail addresses, the date and time of receipt as well as the subject of the e-mail. The exact layout of this Waiting Room can be changed depending upon the users requirements.

An Empty button 56 is associated with the Waiting Room 20. This button discards all e-mails in the Waiting Room folder. If the folder is not empty, a pop up box will be displayed with a warning ensuring that the user wishes the Waiting Room to be emptied. If this is the case, a pop up button would allow the user to proceed. If the user does not wish to empty the e-mails in the Waiting Room, the initial request would be canceled and the e-mails included therein would not be cleared.

The Add to No Admittance button 58 associated with the Waiting Room 20 would add the addresses of all selected e-mails in the Waiting Room to the automatic discard filter. The No Admittance List in the no admittance window will scroll to reveal newly added addresses.

The Guest List window 54 would include a list of names on the Guest List filter. Any incoming e-mail whose new address matches one of the addresses on this list is immediately forwarded to the In Box folder 18. Addresses may be added to this list via the add to Guest List button 60, text entry, or by dragging a selected e-mail to this window with a mouse.

The In Box 18 includes only those e-mails that have successfully passed through both the automatic discard filter and the Guest List Filter. Additionally, any e-mail from any folder, may be selected and dragged into the In Box 18 by the user using the mouse. Similar to the Waiting Room 20 the In Box 18 includes the e-mail addresses, the date and time of receipt as well as the subject matter of the e-mail. Furthermore, the particular configuration of the In Box 18 as illustrated in FIG. 2 can be changed depending upon the users requirements. By clicking on an open slot in the No Admittance List 52 or the Guest List 54 or by double clicking on a existing text, the user may enter a character string to be checked in the filtering system. Any such character string on the No Admittance List will bar the entry of any e-mail with matching text in its address, subject line or message body. For example, as shown in the No Admittance List 52, any received e-mail with the words "free money" in its subject or message would be discarded. A text string similarly entered in the Guest List would forward all messages containing that character string to the In Box. Text entry can also be used to type in new e-mail addresses or edit existing ones on either of the filter lists.

The use of the click and drag technology would allow a graphic user to be used to transfer the address or character string of an e-mail to either the Admittance List or the Guest List.

FIG. 3 illustrates a typical block diagram of the major components of the preset invention. The present invention can be utilized by a home user 17 or by a corporate user 19 connected to the Internet 11. The provider of the preset invention is also connected to the Internet and Intranet 11 allowing a web server 13 to advertise the present invention through a home page 15. The provider connected to the Internet and Intranet 11 at a second location allows the automatic discard filters 11 of the users to be particularly updated. A local area network (LAN), wide area network (WAN) or any other type of network provided at the remote location 46 allows the address filter server 22 to be in communication with the database server 24 as well as a filter database administration tool 25 allowing the provider to maintain complete control over the state of the address filter and the filter database. FIG. 3 also illustrates the Internet and Intranet 11 connections between a typical home user and a corporate user.

The address filter server 22 would relay e-mail filter user requests to the filter database of the database server 24 and meeting appropriate calls via RPC to a library on the database server or by sending SQL commences to the database directly. The address filter service will be implemented via connection based (TCP) communication. The sending of new addresses from an e-mail filter user to the filter database could be handled by connectionless (UDP) communication since failure to handle all new addresses is not critical.

FIG. 3 illustrates a situation in which the e-mail filtering can occur directly at the home user's PC 17 or a corporate user's PC 19 and communication is provided over the Internet and Intranet 11 to the remote location 46. However this invention can be practiced employing a centralized e-mail system database 21 connected to the home user's PC 17 or the corporate user's PC 19 through the Internet and Intranet 11. In this situation the filtering is accomplished at the centralized e-mail system database which is the location of the e-mail directed to the home user or the corporate user.

Figure 4:
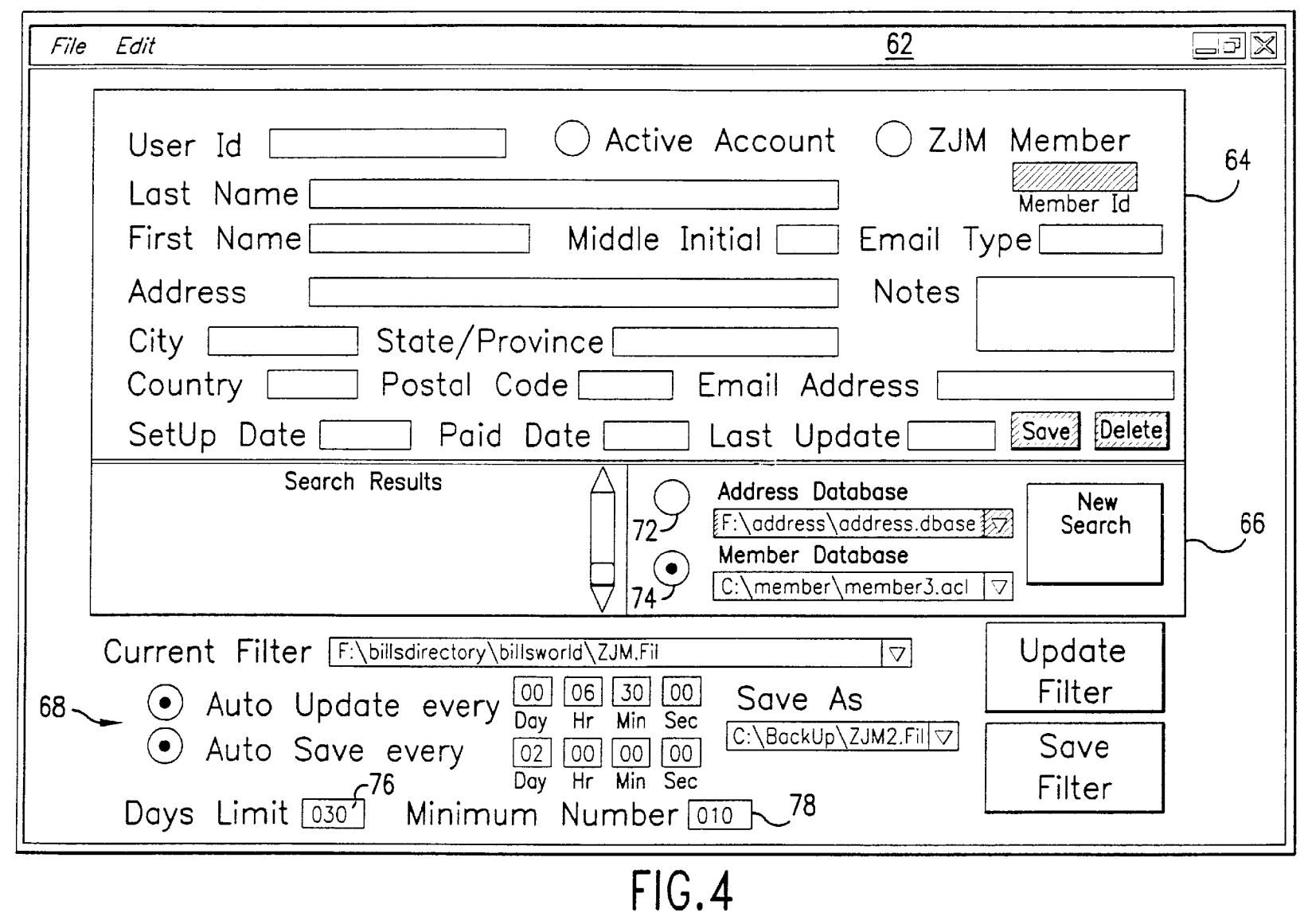
Figure 5:
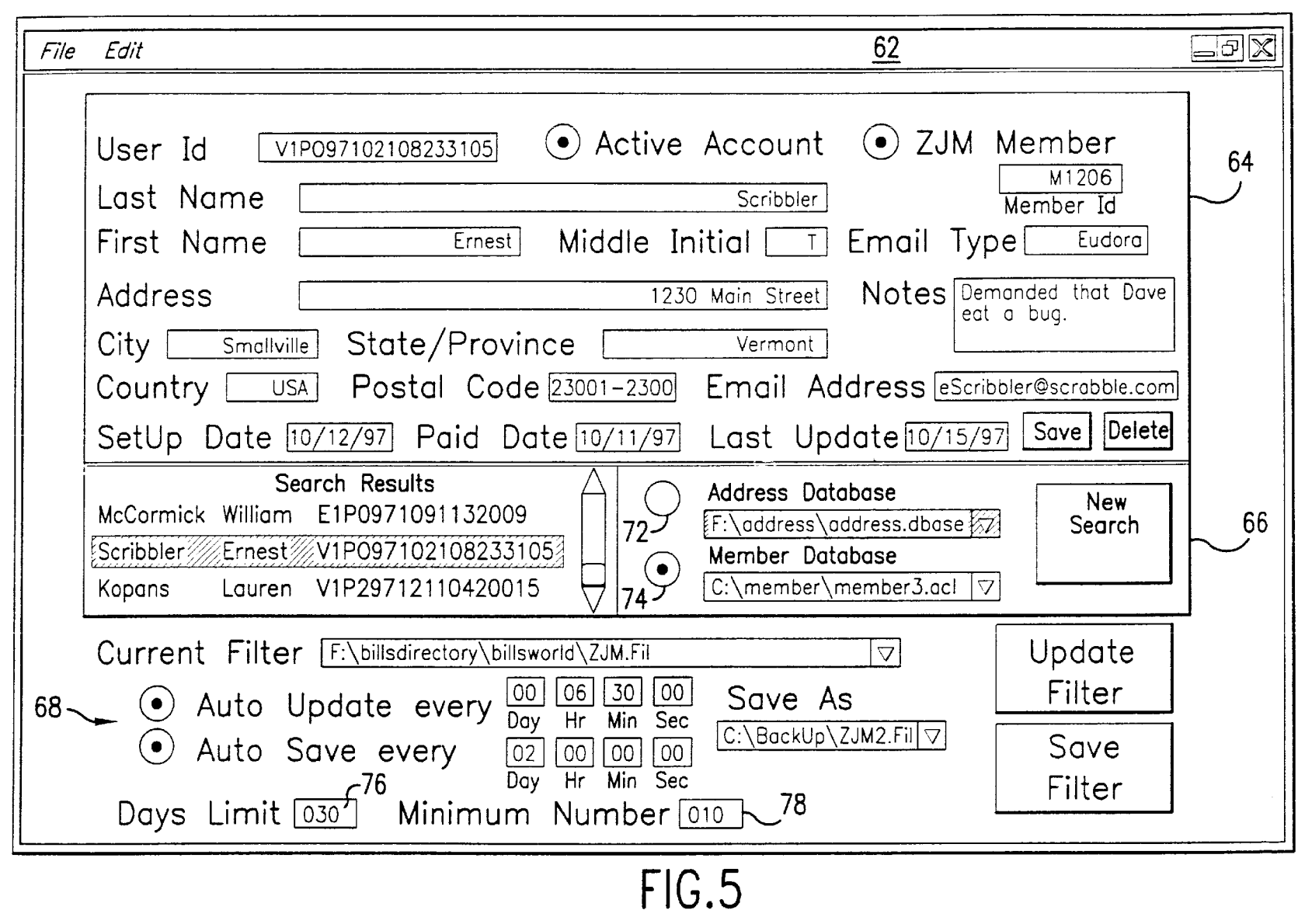
Figure 6:
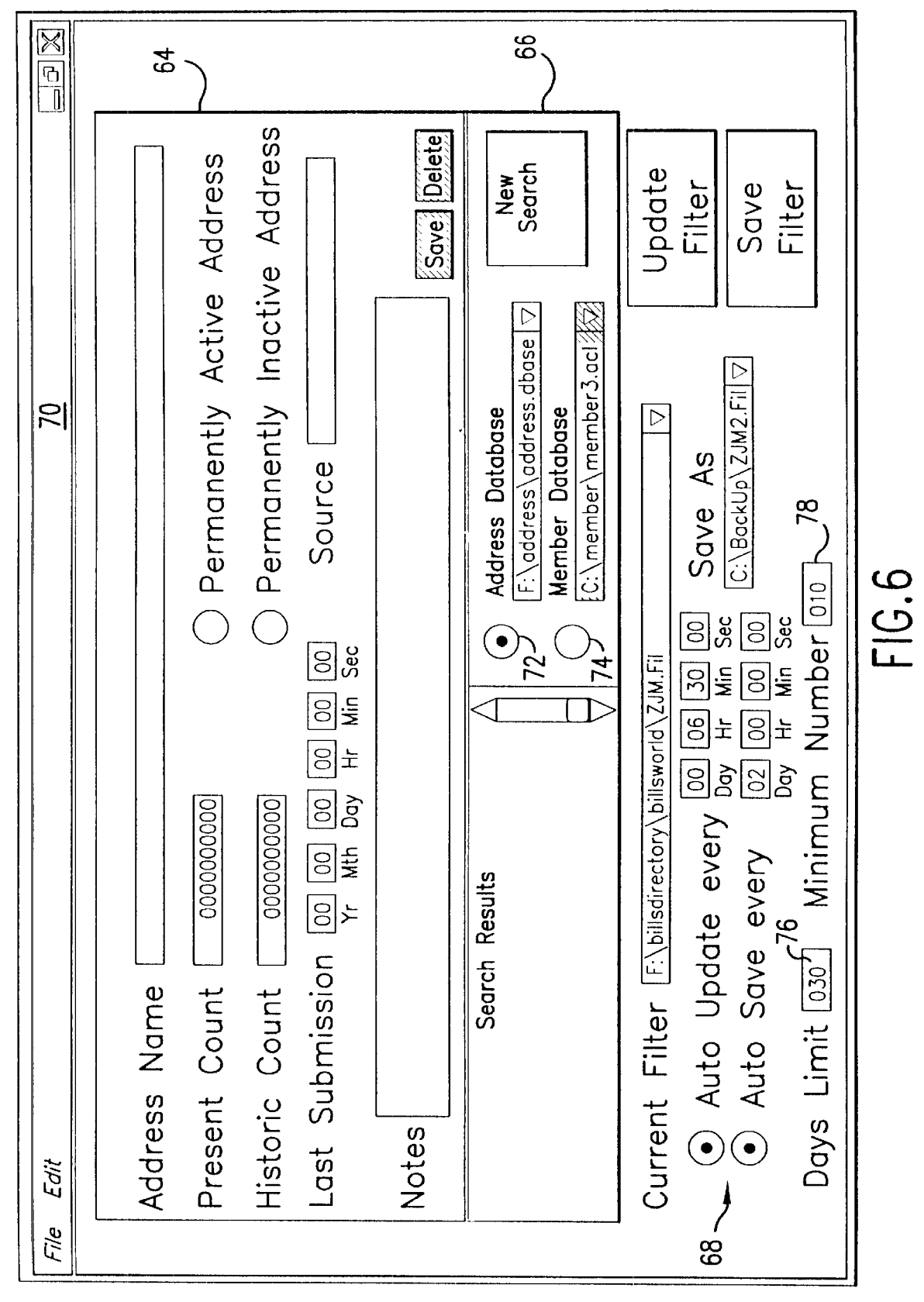

FIGS. 4–7 illustrate typical control screens used by the administrator of the present system at a remote central location. These screens are used for maintaining, searching and editing both the address database which consists of every address that has been sent to the central location address filter server 22 or added via a centralized control interface as well as the member database consisting of all members who have set up and updated their software. FIG. 3 illustrates a "blank" address database screen and FIG. 4 illustrates this database screen when information has been entered therein.

Both the control screen for the member database 62 and the address database 70 contain a search field 64, a search panel 66 and a filter panel 68. The search field 64 would contain information matching an entry in either the address database or the member database. Buttons 72 and 74 would allow either of these databases to appear on the control screen. Both of these databases would include search results run in either the address database or the member database in Section 66. The current filter Section 68 would allow entries to be updated or saved at various times. It would also include a box 76 indicating the number of days an address can remain on the current filter list without a new instance of that address being uploaded by the filter users. It would also include a box 78 listing the minimum number of reportings required for an address to be placed on the current filter list. Certainly both of these central screens can be set up in multitude of ways depending upon the specific information to be provided.

Returning to FIG. 1, the process of comparing received e-mails to both the Automatic Discard filter 12 and the Guest List filter 14 will now be explained. Incoming e-mails 28, 30 and 32 are compared to information contained in the user modified discard filter, the user personal address filter and the users personal string filter utilizing the address line, the subject line as well as the message body. Since the information included in e-mails 28, 30 and 32 are not contained in the automatic discard filter, all three of these e-mails are directly transmitted to the Guest List filter 14. The e-mail addresses, subject line and message body of these three e-mails result in a match for all three of these e-mails. Consequently, these e-mails are sent to the In Box folder 18.

E-mails 34 and 36 were sent from a known bulk e-mailer. Since information in these e-mails are included in the automatic discard filter 12, both of these e-mails are directly sent to trash 16.

Four unknown e-mails 38, 40, 42, and 44 are initially sent to the automatic discard filter 12. E-mail filter 38 is automatically stopped by the automatic discard filter and sent to trash 16. Although the address of this e-mail is not initially included in the automatic discard filter 12 the subject line or message body contains a character string included in the automatic discard filter. The address of this e-mail is automatically added to the discard filter 12. During the next master filter update, this new junk e-mail address will be forwarded to the Delta Filter Server 22. E-mail 40 passes through the automatic discard filter 12 and is stopped by the Guest List filter 14 and is then forwarded to the Waiting Room folder 20. Upon review, the user decides to place this address on the automatic discard filter. Future e-mails from the same sender will be sent to trash. During the next master filter update, this new e-mail would be forwarded to the Delta Filter Server 22. E-mail 42 passes through the automatic discard filter 12 and is stopped by the Guest List filter 14 and is then forwarded to the Waiting Room folder 20. The user reviews this e-mail and decides to place it on the Guest List. Future e-mails from the same sender will be sent to the In Box folder 18.

E-mail 44 passes through the automatic discard filter and is stopped by the Guest List filter 14 and sent to Waiting Room 20. Since the user took no action with respect to this e-mail, it would remain in the Waiting Room folder.

Collaborative Filtering Technology (CFT) is a filtering solution for stopping junk e-mail and involving end users in the war against spam. CFT works by leveraging the actual spamming experiences of end users to create a dynamically changing set of junk e-mail filter rules. These rule sets are then used to sort spam. The technology is simple, effective and empowers end users by involving them as active players in the spam wars.

Collaborative Filtering Technology is the best e-mail filtering solution for organizations with numerous e-mail users such as Internet service providers (ISPs), free Internet e-mail an providers, and MIS departments of major corporations. This technology integrates well across various platforms and infra-structure architectures, providing an extremely high level of end user protection with relatively little administrative burden. Collaborative filtering maximizes benefits while minimizing costs.

When an end user receives a piece of e-mail that he or she decides is junk mail, the user submits that message to the Collaborative Filter through a simple button click. The e-mail's body is analyzed and it is stored in the Collaborative Filter. When a small but statistically significant number of the same message have been submitted, the Collaborative Filter is updated to start filtering all such messages from the system. Unlike other e-mail filtering systems, the Collaborative Filter does not exclusively utilize source filtering. Source filtering uses an e-mail's header information to filter e-mail from given source addresses. Experience indicates that source filtering is inappropriate for completely filtering junk e-mail since e-mail headers are easily forged. Instead, the Collaborative Filter of the present invention uses message filtering based on an e-mail's body. Because the e-mail's body must contain a message (i.e. advertisement) and this message cannot be drastically altered, the body is therefore the most appropriate data to be used for filtering.

The Collaborative Filter is an implementation of server side filtering. Server side filtering is filtering that occurs at the Mail Server or Mail Drop Service level. This is a different approach from client side filtering, in which filtering occurs at the Mail Reader level. Server side filtering is appropriate for any organization that manages its own Mail Servers and Mail Drop Services because it saves network, storage resources, and end user time by stopping spam from propagating throughout the network.

Figure 8:
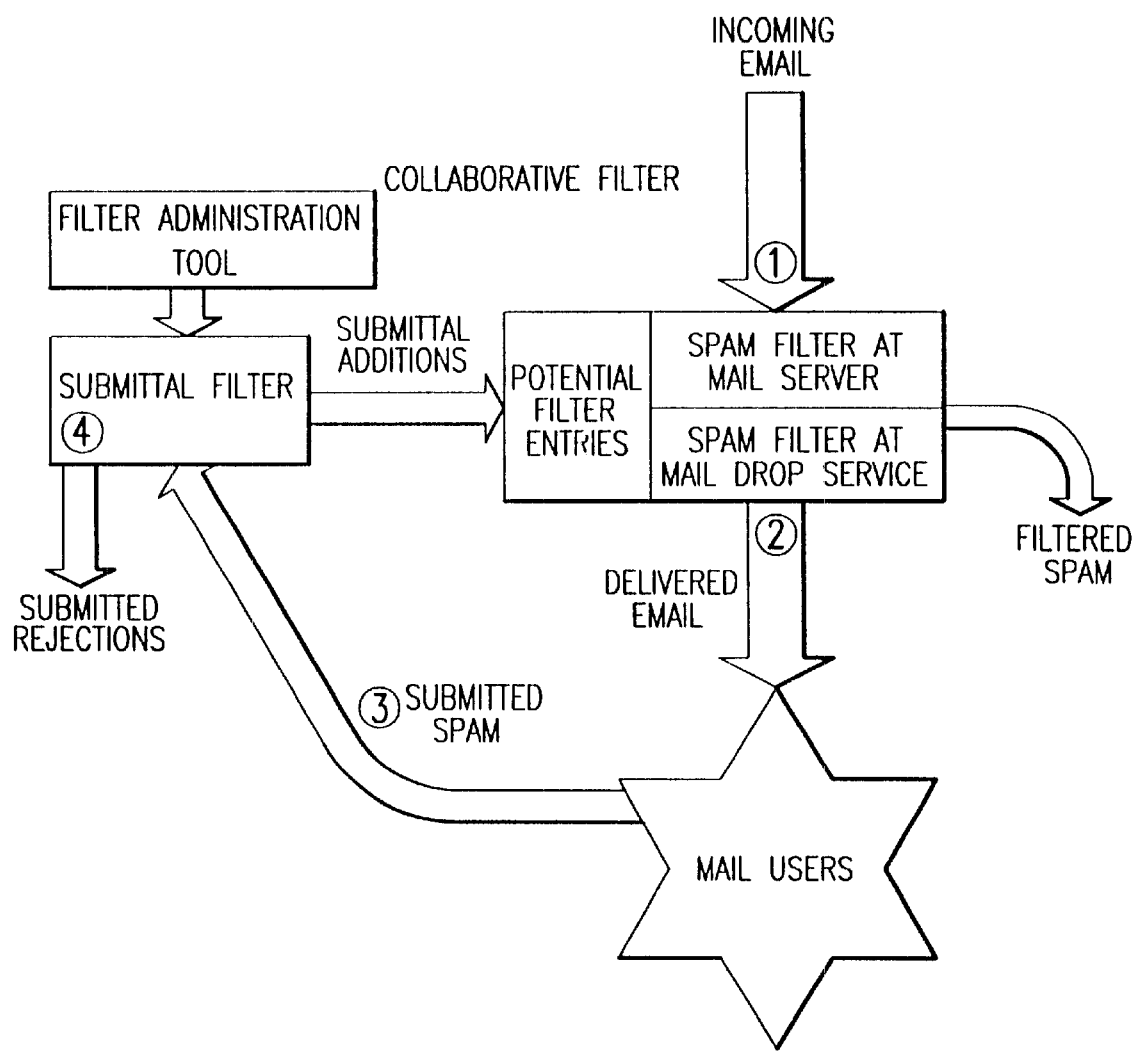
FIG. 8 is a block diagram illustrating the collaborative filter of the present invention.

The Collaborative Filter is comprised of two major components: the Spam Filter and the Submittal Filter. The Spam Filter is responsible for filtering incoming e-mail while the Submittal Filter filters user submissions to the Spam Filter. These two components cooperate to form the Collaborative filtering process that consists of the following major steps as shown in FIG. 8.

All incoming messages are first filtered at the Mail Server using the Spam Filter. If the incoming message is found on the Spam Filter, it is discarded. All other messages pass through to the Mail Drop Service.

E-mail is then distributed to the end user mailboxes. When users download their e-mail from the Mail Drop Service, it is filtered again via the Spam Filter. Those that match are discarded before the users ever see them. All other messages pass safely through to the user. It is necessary to filter at both the Mail Server and Mail Drop Service level to ensure that end users are protected by the latest updates to the Collaborative Filter. However, the system would still operate if no filtering were to be done at the Mail Drop Service level.

When end users receive a spam message, they need only to press a button to submit it to the Collaborative Filter. This simple action forwards the junk e-mail to a mailbox (e.g. spam@isp.net) where it is examined by the Submittal Filter and, if appropriate, is used to update the Spam Filter. If the message does not already exist in the Spam Filter, then it is added. If it is already present, then the time of submission is recorded, and the total number of submissions of that spam is increased by one. The filter uses this counter to determine whether to filter against this message. Only messages received within a certain time frame with a counter greater than or equal to a predetermined threshold will be used in filtering. This threshold ensures that a small but statistically significant number of users have submitted to the same spam message before it is filtered. This prevents inappropriate filtering due to user errors of improper submissions.

System administrators use the Filter Administration Tool to define a list of e-mail addresses or domains that cannot be submitted to the Spam Filter. This list is included in the database of the Submittal Filter. This prevents end users from submitting messages from known valid sources such as system administration broadcast messages or mailing lists.

Figure 9:
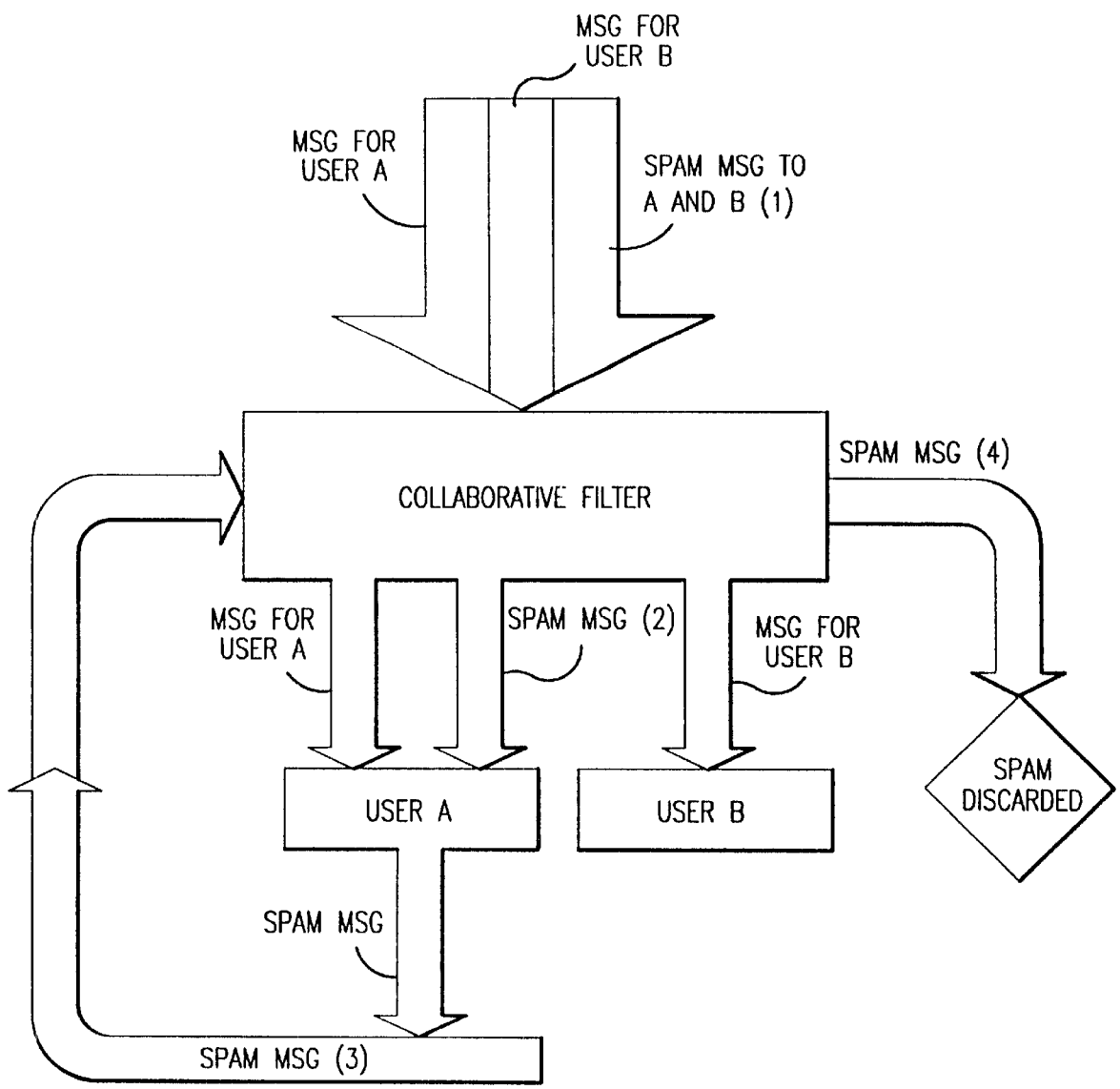
FIG. 9 is a block diagram illustrating how the collaborative filter is updated.

FIG. 9 illustrates an example of the operation of the Collaborative Filter. In this simple example, there are two users (user A and user B), and one spam message sent to both users. The spam message has never been processed before by the Collaborative Filter.

Initially, the spam message enters the system. User A logs on first and checks his e-mail. User A downloads two messages: his non-spam message and a spam message. Note that the spam message passes through the filter since it has never been seen before. User A notes the spam message and submits it to the Collaborative Filter via a simple button click. The Collaborative Filter uses User A's submission to update the filter. From this point on, any new incoming message that matches the submitted spam e-mail will be discarded.

User B now logs on and checks her e-mail. User B only downloads the non-spam message because the Collaborative Filter filters out the spam message intended for User B based on User A's collaboration.

Note that this is a simplified example of the filter's operation. There are only two end users and the Collaborative filter begins filtering after one submittal. In actuality, the number of end users will be far larger and the Collaborative Filter will only start filtering a spam message after it has been submitted by a significant number of those users. The majority of users will be Spam free like User B, while a small percentage of users experience spam and protect the larger end user community (like User A).

The Collaborative Filter consists of two major components, namely the Spam Filter and the Submittal Filter.

The Spam Filter filters incoming e-mail, and the Submittal Filter filters end user junk e-mail submissions to the Spam Filter. End user submissions update the Spam Filter while system administrators decide what entries reside on the Submittal Filter. System administrators can add, remove, and update entries on both the Spam Filter and Submittal filter via a Filter Administration Tool.

Figure 10:
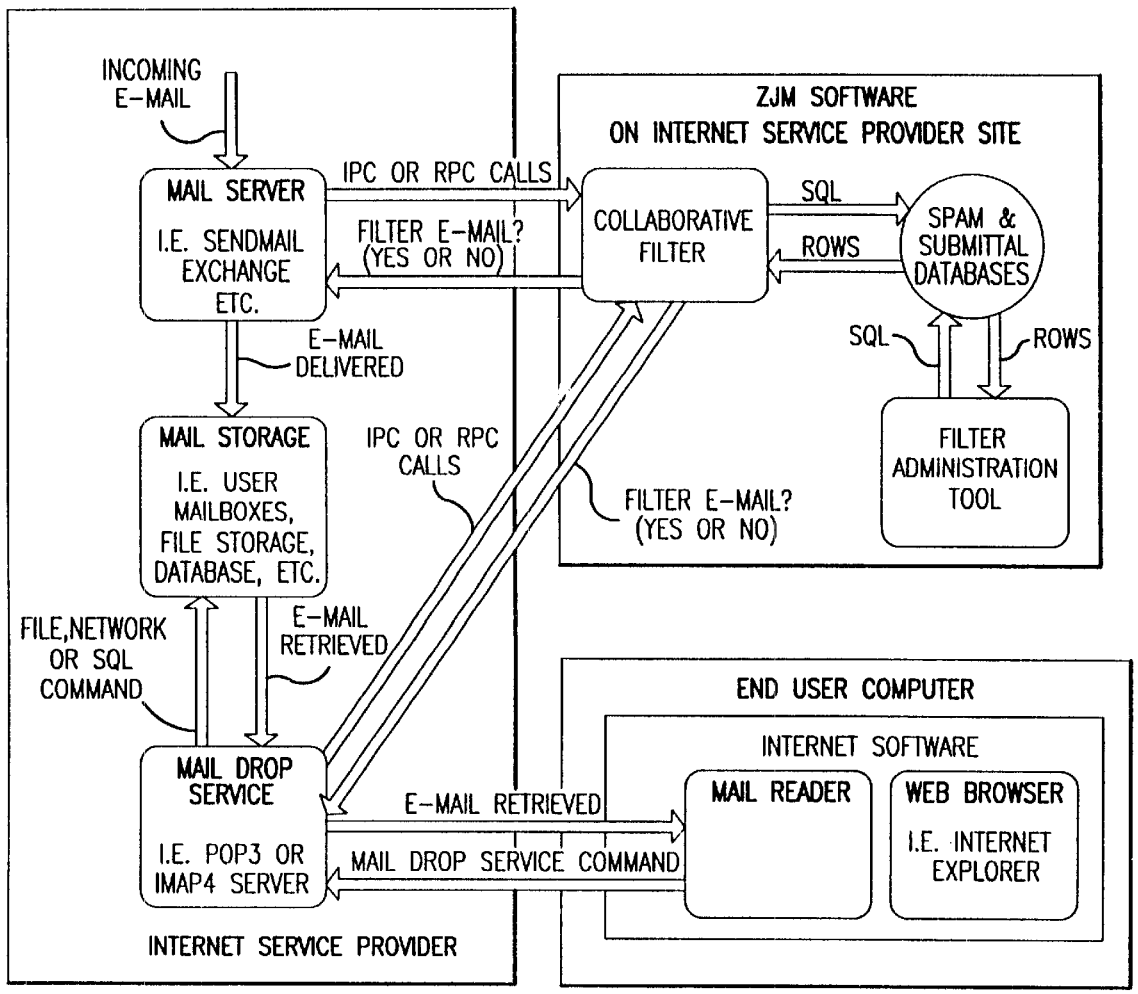
FIG. 10 is a block diagram illustrating server side e-mail filtering.

The Collaborative Filter is a server side filtering solution as shown in FIG. 10. Service side filtering occurs at the mail Server or Mail Drop Service level. This is a different approach from client side filtering, which occurs at the Mail Reader level. Server side filtering is appropriate for any organization that manages its own Mail Servers and Mail Drop Services because it saves network and storage resources by stopping spam from propagating throughout the corporate network. Another advantage is that end users are not forced to waste time downloading, reading, and deleting junk e-mail. Note that client side filtering is an appropriate filtering technology when end users are not protected from junk e-mail by server side filtering products. FIG. 10 also illustrates a typical server side filtering scenario.

It is noted that filtering at the Mail Drop Service ensures that the most recent updates to the Spam Filter are used to eliminate junk e-mail that has already been sent to a user's mailbox, but has not yet been downloaded. This allows the Collaborative Filter to eliminate spam to most users on its first mailing.

The Collaborative Filter is implemented via a set of C libraries. The Collaborative Filter has been implemented in C due to the following requirements:

1. The Collaborative Filter must be efficient.
2. The Collaborative Filter libraries must be cross-platform.
3. The libraries must allow for easy integration with customer software.

A C implementation achieves these goals because:

1. C is a highly efficient development language because it is compiled. Its long history has allowed for the development of highly optimized compilers.
2. The C language is highly portable, since most hardware vendors provide C compilers for their products. In addition, the ANSI C standard defines a standard library, which can be reliably used to write portable code.
3. C is an industry-wide development language, used by millions of developers around the world. Therefore, it is extremely likely that any customer can integrate the Collaborative Filter libraries into his/her software. In addition, most popular development languages allow for calling C directly (e.g., C++, Java, Perl, Visual Basics, etc).

The Spam Filter Library contains the code needed to filter e-mail. This library contains the spamCheck( ) routine which is used to check if a given e-mail is junk. The caller passes a structure to spamCheck( ) which contains pointers to the headers and body of the message to be checked. Therefore, if a message's headers and body are already in memory (e.g., when a Mail Server is processing a SMTP connection), then no memory copying will be needed and spamCheck( ) can efficiently check whether a message is junk.

The spamCheck( ) function checks whether a given e-mail is junk in the following fashion:
1. spamCheck( ) generates a signature for the message.
2. spamCheck( ) queries the Spam Database for the message's signature.
3. If the database query does not find the message's signature, then the e-mail is not junk and it an be passed on to end users.
4. If the database query does find the message's signature, then a matching function is used to determine whether or not the message in questions truly matches a message in the Spam Filter database.
   a. If the matching function does not find these messages to be equivalent, then the message is not junk.
   b. If the matching function does find these messages to be equivalent, then the message is filtered.

Source filtering is based on a message's sender information. Most source based filtering techniques use the "From" address from the message's header. Source based filtering is not appropriate for completely filtering junk e-mail since headers are easily forged. To overcome this limitation, the Collaborative Filter primarily uses the message body for filtering. This is known as message based filtering.

The signature described in the above process is a hash function based on the message's body. Message signatures are very important because they allow the Collaborative Filter to operate in an efficient manner. The message signature enables non-junk e-mail messages to quickly pass through the filter. This occurs because it is extremely unlikely that an incoming non-junk message signature will match the signature of a junk e-mail already stored in the database.

Since the message signature is a type of hashing function, there will be some unavoidable signature collisions (i.e., two unique messages which generate the same signature). The filtering algorithm resolves signature collisions by calculating a matching function on both messages to ascertain if these messages are really equal. The matching function uses a combination of techniques (e.g., checksum, fuzzy matching) to generate a likelihood that two messages are essentially equivalent. Exact comparisons cannot be used since junk e-mail senders will embed extra characters in their outgoing e-mails to circumvent message based filtering techniques. For example, spammers may add extra characters at the beginning of a message by including personalized salutations. A fuzzy matching function is the appropriate solution to this problem because a spammer cannot change that portion of an e-mail's body that contains his or her message (e.g., advertisement).

The Submittal Library contains the code needed to handle user submissions to the Collaborative Filter. The library contains the spamSubmit( ) routine which is used to submit a user's junk e-mail message to the Collaborative Filter.

End users will have a mechanism for forwarding a piece of junk e-mail to the Collaborative Filter. This mechanism will forward the junk e-mail message to a defined mailbox for handling junk e-mail (e.g. spam@isp.net). The Submittal Library is then used to process these incoming junk e-mail submissions.

The main job for the Submittal Library is to filter incoming submittals to ensure that valid messages are not included in the spam filter. Examples of such messages are system administration broadcast messages and mailing lists.

The spamSubmit( ) routine submits spam to the Spam Filter in the following fashion:
1. The forwarded junk e-mail is parsed from the submission e-mail sent by an end user.
2. The Submittal Filter is checked to determine whether this submitted junk e-mail should be added to the Spam Filter.
3. When a submitted junk e-mail is added to the Spam Filter, the Spam Filter is updated by spamSubmit ( ).

Note that the Submittal Filter is not updated via the spamSubmit ( ) routine. The Submittal Filter is updated by the Filter Administration tool that uses direct SQL commands to add/remove/update entries on the Submittal Filter.

The Spam and Submittal Filters are both stored in relational databases. Relational database technology was chosen due to its mature nature and ability to handle numerous transactions. These are extremely important considerations since the Collaborative Filter will filter all incoming e-mail.

The Collaborative Filter only interacts with relational databases via SQL commands. This allows the Collaborative Filter to be integrated with any SQL compliant database. Leveraging existing database technology allows the execution of a filtering product that is more cost effective, efficient and reliable. In addition, since the filter back-end is implemented via a database, customers and other third parties can access the filter's data for their own specialized needs.

Figure 11:
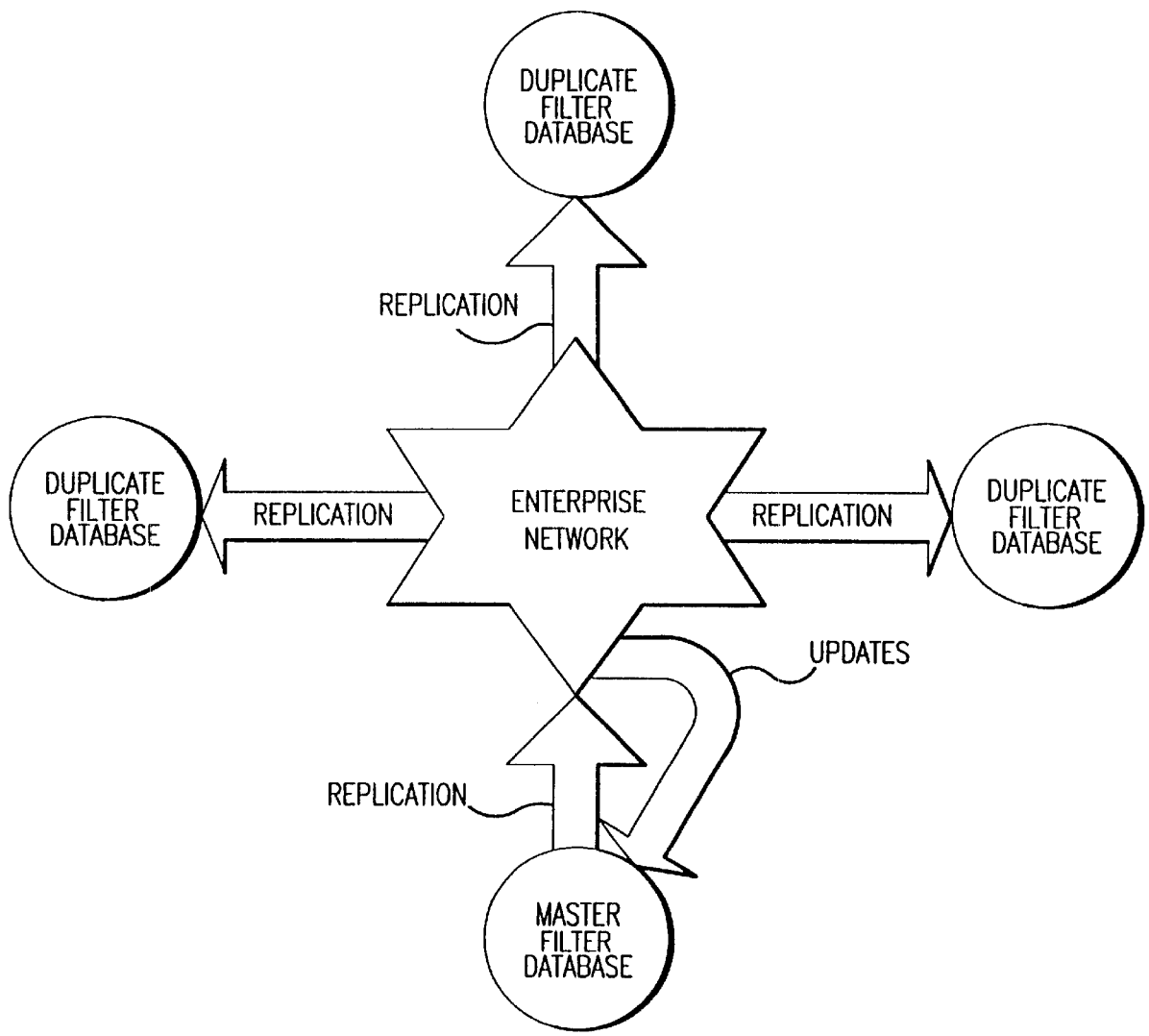
FIG. 11 is a block diagram illustrating the collaborative filter replication design.

By using off the shelf relational database products, the Collaborative Filter can utilize those products' replication technology to scale the Collaborative Filter across the enterprise as shown in FIG. 11. The Collaborative Filter's replication design is based on one master database and numerous read-only replicated sites. This simple replication strategy contains no update conflicts and is available from various database vendors (e.g., Sybase's Replication Server, Oracle Snapshots).

Under this scheme, network bandwidth allocation is flexible, since the schedule for database replication can be modified to meet other operational needs. Administrators have control over how much network bandwidth they are willing to spend for more effective junk e-mail filtering (i.e., the more synchronized the databases, the more effective the filter).

The Filter Administration tool allows system administrators to administrate the Spam Filter and Submittal Filter. This tool is the main mechanism for adding, removing and updating entries on the Submittal Filter.

The Filter Administration Tool consists of a web based front end making Hyper Text Transfer Protocol (HTTP) requests to a Java Servlet interacting with the Spam Filter and Submittal Filter databases with Java Database Connectivity (JDBC). This design has the following advantages.
1. Administration can use any web browser to administrate the Collaborative Filter.
2. This Java solution allows the Filter Administration Tool to be both platform and browser independent.
3. The performance requirements of the application are well within the performance parameters of Java.

The Collaborative Filter is designed to be tightly integrated with a customer's existing Mail Servers, Mail Drop Services, and relational databases. Due to the range of customer requirements, one should anticipate that some amount of custom coding would likely be required to integrate the Collaborative Filter into a customer's operations.

A Mail Server and Mail Drop Service Integration is the most involved step in integrating the Collaborative Filter since source code modifications must be made to a customer's Mail Server and Mail Drop Service. The Mail Server and Mail Drop Service must be modified to call the spamCheck( ) routine at appropriate places.

However, even if customers do not have access to their Mail Server or Mail Drop Service source code, the Collaborative Filter can still be integrated in a proxy application. For example, a proxy SMTP application can be built which sits on top of the Mail Server and makes calls to the Spam Filter library. E-mail that passes the filter in the proxy application is then forwarded to the Mail Server by the proxy. Note that the same can be done for POP3 and IMAP4 Mail Drop Services.

A relational database system must be allocated to hold the Collaborative Filter. The system must be able to handle the extra bandwidth generated by queries form the Spam Filter library. For large organizations, it is recommended to use a dedicated database system for the Collaborative Filter. Customers should note that the Collaborative Filter has an unusual query load compared to most on-line transaction processing systems, since over 90% of its requests will be pure queries (i.e., there will be very few inserts, updates or deletes). Due to this unique query load, a dedicated database system that can be optimized for filtering is recommended.

Once a database system has been allocated, installation consists of running several SQL scripts to install the Collaborative Filter. When the database has been installed, the customer will have to perform standard database administration tasks (e.g., backup).

Once the Spam Filter and Submittal Filter databases have been set up, the Filter Administration Tool's Java Servlet must be installed on a Web server that has access to these databases. System administrators will then connect to this Web server to administrate the Collaborative Filter via their Web browser.

The present invention has been explained with respect to specific arrangements and methods. However, it is noted that these arrangements and methods are merely illustrative of the principles of the present invention. Numerous modifications in form and detail may be made by those of ordinary skill in the art without departing from the scope of the present invention. Although this invention has been shown in relation to a particular preferred embodiment, it should not be considered to be so limited.

What is claimed:

1. A method for mail server side filtering electronic mail received over a communication medium comprising the steps of:

providing a first filter at the mail server including a list of spam messages which should not be sent to an end user;

receiving a first electronic message ultimately intended for one or more end users at the mail server;

comparing at the said mail server said received first electronic message to said spam messages provided in said first filter, said received first electronic message discarded if said received first electronic message is included as a spam message in said first filter and transmitting said first electronic message to the end user if said received first electronic message is not included as a spam message in said first filter;

providing a second filter at the mail server for the receipt of a second electronic message sent over the communications medium from an end user, said second electronic message received at said second filter considered to be a spam message by the end user;

providing a counter associated with said second filter;

counting the number of repeated second electronic messages received by said second filter;

adding said second electronic message to said first filter as a spam message, if said counter exceeds a predetermined value; and adding said second electronic message to said first filter as a spam message, if said second filter determines that said second electronic message is a spam message.

2. A system for filtering electronic mail received over a communication medium to an end user's computer, comprising:

a mail server for receiving first electronic messages intended to be received by the end user, said mail server provided at a location remote from the end user;

a first filter located at said mail server, said filter including a list of spam messages which should not be sent to the end user, said first filter also including a device for comparing at least a portion of the body of said first electronic messages with each of said spam messages;

a second filter located at said mail server for receiving second electronic messages transmitted over the communication medium to said mail server from the end users;

a counter and comparison device located at said mail server and in communication with said second filter for counting and classifying the number of said second electronic messages received by said second filter, said counting and comparison device determining the number of similar second electronic messages received by said second filter;

wherein when the number of similar second electronic messages received by said second filter exceeds a predetermined number, said similar second electronic message is added to said first filter as an additional spam message.

* * * * *